United States Patent [19]

Okuda

[11] 4,332,050
[45] Jun. 1, 1982

[54] SELF-PROPELLED RECORD CLEANER

[75] Inventor: Tadanobu Okuda, Toyonaka, Japan

[73] Assignee: Kyushu Hitachi Maxell, Ltd., Fukuoka, Japan

[21] Appl. No.: 210,815

[22] Filed: Nov. 26, 1980

[30] Foreign Application Priority Data

Nov. 27, 1979 [JP] Japan .......................... 54-164454[U]

[51] Int. Cl.³ .......................... B08B 11/00; G11B 3/58
[52] U.S. Cl. ......................................... 15/246; 15/23; 15/41 R; 369/72
[58] Field of Search .................... 369/72-74; 15/246, 21 E, 23, 41 R, 77, 256.5

[56] References Cited

U.S. PATENT DOCUMENTS

| | | | |
|---|---|---|---|
| 2,237,638 | 4/1941 | Sinclair | 369/72 |
| 2,296,156 | 9/1942 | Fuller | 369/72 |
| 2,322,470 | 6/1943 | Rojas | 369/72 |
| 2,338,843 | 1/1944 | Glaser et al. | 15/246 X |
| 3,185,485 | 5/1965 | Brubaker | 369/74 |
| 4,166,626 | 9/1979 | Sandor et al. | 369/72 |
| 4,202,071 | 5/1980 | Scharpf | 15/77 X |

Primary Examiner—Robert L. Bleutge
Attorney, Agent, or Firm—Craig & Antonelli

[57] ABSTRACT

A self-propelled record cleaner comprising a cleaning brush, a drive wheel, and a battery-operated motor unit for driving both of the cleaning brush and the drive wheel in the opposite directions with respect to each other. The self-propelled record cleaner has a arm having a bearing hole adapted to receive a turntable spindle when the record cleaner is placed on a disc record mounted on the turntable. This self-propelled record cleaner can run on the disc record around the turntable spindle while brushing or cleaning dusts off from the disc record when the battery-operated motor unit is in operation.

4 Claims, 4 Drawing Figures

SELF-PROPELLED RECORD CLEANER

BACKGROUND OF THE INVENTION

The present invention generally relates to a record cleaner for cleaning a phonographic disc record and, more particularly, to a self-propelled record cleaner having a battery-operated motor drive which enables the cleaner to run on the disc record while removing dusts therefrom.

Various types of record cleaners are currently available in the market. Of them, the most sophisticated one is considered a battery-operated record cleaner such as disclosed in the Japanese Laid-open Utility Model Publication No. 54-125204 laid open to public inspection on Sept. 1, 1979.

According to the above mentioned laid-open publication, the battery-operated record cleaner comprises a generally rectangular-sectioned casing having upper and lower chambers defined therein, a cylindrical brush rotatably accommodated in the lower chamber with a portion of the outer periphery of the cylindrical brush exposed to the outside in a direction opposite to the upper chamber, a battery-operated motor housed within the upper chamber together with at least one battery, and an endless belt transmission system for transmitting the drive of the motor to the cylindrical brush. A pair of opposed side walls of the casing defining the lower chamber have a plurality of vent openings, such as parallel slots, through which air current induced by the rotation of the cylindrical brush is vented to the outside. Dusts carried by the air current so induced are adapted to be trapped by filter cloths attached to the perforated side walls, which perforated side walls are so hingedly supported as to be opened for the removal of the dusts accumulated within the lower chamber.

A portion of the casing above the hingedly supported and perforated side walls and adjacent the upper chamber serves a grip accessible to the hand of a user.

The record cleaner of the construction disclosed in the above mentioned laid-open publication is also provided with an optionally retractable guide piece adjacent one end of the cylindrical brush. This guide piece when set to a projected position enables the user to turn the record cleaner around the center opening of the disc record with the guide piece held in sliding contact with the outer peripheral edge of the disc record.

Although the use of the guide piece appears to be convenient for the user to turn the record cleaner around the center opening of the disc record to be cleaned or brushed, there still remains such a disadvantage that the user is forced to take care lest the guide piece should depart from its contact with the outer peripheral edge of the disc record. In addition, even though battery-operated, the conventional record cleaner is a hand-held type and, so long as it remains a hand-held type, the disc record being cleaned or brushed is likely to receive uneven pressure applied thereto through the brush. The application of the uneven pressure to the disc record is, as is well understood by those skilled in the art as well as audio-manias, likely to result in formation of indents on each delicate, grooved surface of the disc record. Naturally, the formation of the indents on the grooved surface of the disc record in turn results in distorted reproduction of information recorded on the disc record.

An idea of coupling a record cleaner to a turntable spindle while the disc record is mounted on the turntable of a record player in coaxial relation with the turntable spindle so that the record cleaner can turn around the turntable spindle brushing the grooved surface of the disc record is disclosed in the Japanese Utility Model Publication No. 51-27783 published July 14, 1976. According to this publication, the cleaner comprises an elongated casing of a length larger than the radius of the disc record available, a cylindrical brush partly accommodated within the casing and extending from one end of the casing to a substantially intermediate portion thereof, and a shaft member rotatably carried by the casing at a position adjacent the opposite end thereof and extending completely across the casing at right angles to the longitudinal axis of the cylindrical brush in a direction which, when the record cleaner is placed on the disc record with the shaft member aligned with the turntable spindle, is perpendicular to the plane of rotation of the disc record. The shaft member has one end inwardly recessed, or otherwise provided with a socket member, for receiving the turntable spindle and the other end pivotally connected with a foldable handle which, when the record cleaner is in use, protrudes diagonally upwardly from the casing at one side of the shaft member remote from the cylindrical brush.

For rotating the cylindrical brush about its own longitudinal axis, the shaft member is operatively coupled to the cylindrical brush through mating bevel gears fast with the shaft member and one end of the cylindrical shaft, respectively. Since the record cleaner disclosed in the latter mentioned publication is not a motor-driven type, the record cleaner when in use must be manually turned around the turntable spindle while the shaft member is fixed relative to the turntable spindle. Fixing the shaft member relative to the turntable spindle is accomplished by holding the handle with one hand while the other hand is used to turn the record cleaner around the turntable spindle. By so doing, the cylindrical brush is rotated to brush the grooved surface of the disc record while the record cleaner riding on the disc record turns around the turntable spindle.

This simplified record cleaner appears to be more convenient than the above described, battery-operated record cleaner in the sense that the record surface can uniformly be brushed or cleaned in a circumferential direction of the disc record. However, both hands of a user are required to manipulate the record cleaner. In addition, where the record player is placed at a position above the floor approximating to the level of the eyes of the user, attempt to turn the record cleaner on the disc record with his hands raised above the eye level is likely to result in a wobbling motion of the record cleaner while pivoting about the point of contact of the top of the turntable spindle to the shaft member unless the handle is carefully held with the hand to keep the shaft member in exact alignment with the longitudinal axis of the turntable spindle. This wobbling motion of the record cleaner involves uneven application of pressure to the grooved surface of the disc record.

SUMMARY OF THE INVENTION

Accordingly, the present invention has been developed with a view to substantially eliminating the above disadvantages and inconveniences inherent in the prior art record cleaners and has for its essential object to provide a self-propelled record cleaner which, when placed on the disc record and then operated, runs around the turntable spindle while cleaning or brushing the record surface, without requiring for the user to do any manipulative effort to clean or brush the record surface.

Another important object of the present invention is to provide a self-propelled record cleaner of the type referred to above, which is convenient and easy to handle and free from impairing the delicate spiral groove on the record surface.

A further important object of the present invention is to provide a self-propelled record cleaner of the type referred to above, which is free from uneven cleaning or brushing of dusts off from the record surface.

These and other objects of the present invention can, as will be better understood from the subsequent detailed description thereof, be accomplished by employing a battery-operated motor drive unit. The battery-operated motor drive unit is so designed as to transmit a portion of the drive to at least one drive wheel for driving the body of the record cleaner about the turntable spindle and the other portion of the drive to a cylindrical cleaning element which may be the cylindrical brush. The drive wheel may be either made of a rubber material or of a type having its outer peripheral face lined with a rubber material of relatively high frictional coefficient. This drive wheel is so supported that, when the record cleaner is placed on the disc record resting on the turntable of any record player, it contacts a portion of the record surface other than the recorded or grooved area.

In view of the utilization of the battery-operated motor drive unit, it is clear that the self-propelled record cleaner according to the present invention is effective to remove dusts resting on the record surface, thereby uniformly cleaning the recorded or grooved area of the record surface with no possibility of impairing the spiral groove on the record surface. In addition, with the self-propelled record cleaner, there will be no problem in letting a child to clean the delicate, grooved surface of the disc record.

BRIEF DESCRIPTION OF THE DRAWINGS

These and other objects and features of the present invention will become apparent from the following description taken in conjunction with a preferred embodiment thereof with reference to the accompanying drawings, in which.

DETAILED DESCRIPTION OF THE INVENTION

Figure 1:
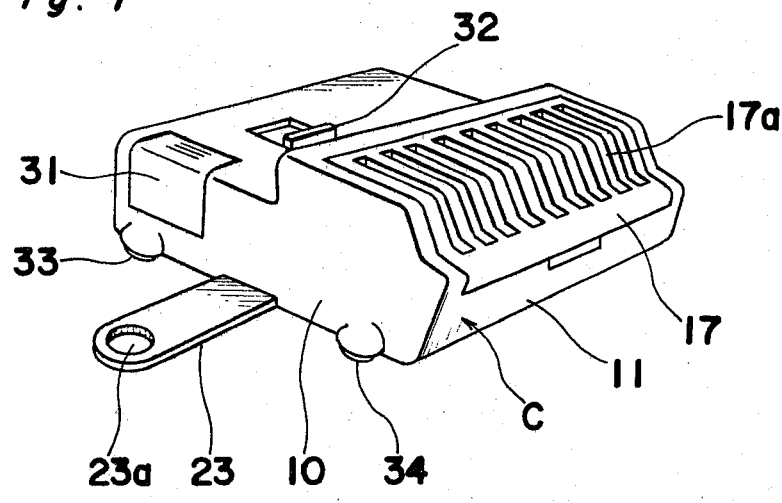
FIG. 1 is a perspective view of a self-propelled record cleaner embodying the present invention.

Before the description of the present invention proceeds, it is to be noted that like parts are designated by like reference numerals throughout the accompanying drawings.

Figure 3:
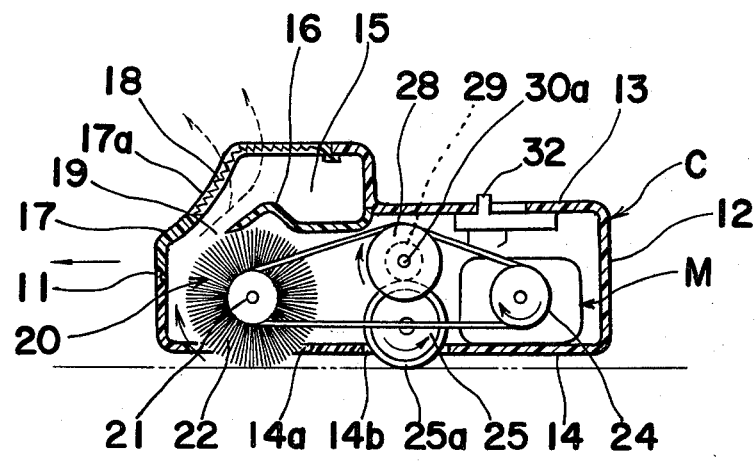
FIG. 3 is a side sectional view of the record cleaner shown in FIG. 1.

Referring now to the drawings, particularly to FIGS. 1 and 3, a self-propelled record cleaner embodying the present invention comprises a casing C comprised of a pair of opposite end walls (only one of which is shown by 10 in FIG. 1), a pair of opposite side walls 11 and 12, and top and bottom walls 13 and 14, all being of one-piece construction with a compartment defined inside the casing C. As best shown in FIG. 3, a side edge portion of the top wall 13 opposite to the side wall 12 is so raised upwardly and so terminating at a position substantially spaced from the upper edge of the side wall 11 as to define a generally rectangular opening leading into a dust collecting chamber 15 defined inside the casing C by a partition wall member 16 and a removable or hingedly supported, perforated lid 17. The perforated lid 17 so far illustrated has a plurality of parallel slots 17a which are covered by any known filter member 18, for example, a filtering cloth, bonded to one surface of the lid 17 facing the dust collecting chamber 15. The partition wall member 16 is of a generally rectangular shape, the opposite ends and one of the opposite side edges being integral with the opposite end walls 10 and the top wall 13 while the other of the opposite side edges thereof is spaced a distance from the side wall 11 to define a generally ribbon-shaped air current passage 19 therebetween.

As best shown in FIG. 3, the bottom wall 13 has a generally rectangular bottom opening 14a and a slot 14b both defined therein, said slot 14b being located adjacent one end of the bottom opening 14a and extending at right angles to the longitudinal axis of the bottom opening 14a, the function of each of said bottom opening 14a and slot 14b being described later.

Figure 2:
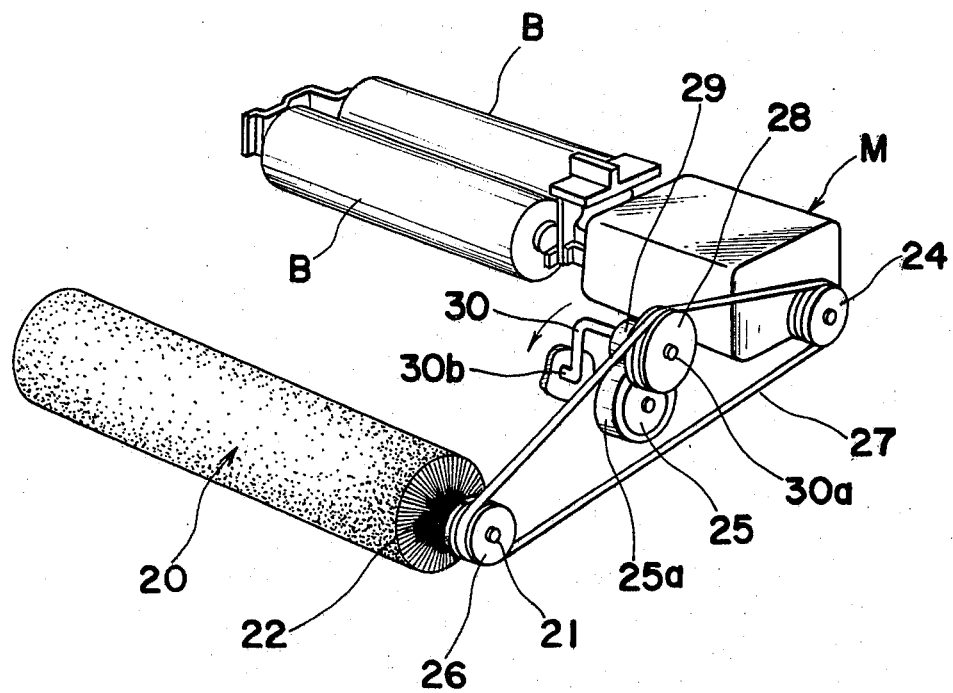
FIG. 2 is a perspective view, on an enlarged scale, of a battery-operated drive unit employed in the record cleaner shown in FIG. 1.

A cylindrical cleaning element generally identified by 20 comprises, so far illustrated, an elongated core member 21 having a cylindrical brush 22 mounted thereon in coaxial relation thereto, said brush 22 being composed of flexible, fine and soft bristles implanted on said core member 21 so as to extend radially outwardly therefrom as best shown in FIG. 2. This cylindrical cleaning element 20 is rotatably supported in any suitable manner, for example, with the opposite ends of the core member 21 journalled respectively to the opposite end walls 10, and is so positioned inside the casing C and below the partition wall member 16 as to permit a generally ribbon-shaped outer peripheral portion of the cylindrical brush 22 to be exposed to the outside through the bottom opening 14a in the bottom wall 14 as best shown in FIG. 3.

Figure 4:
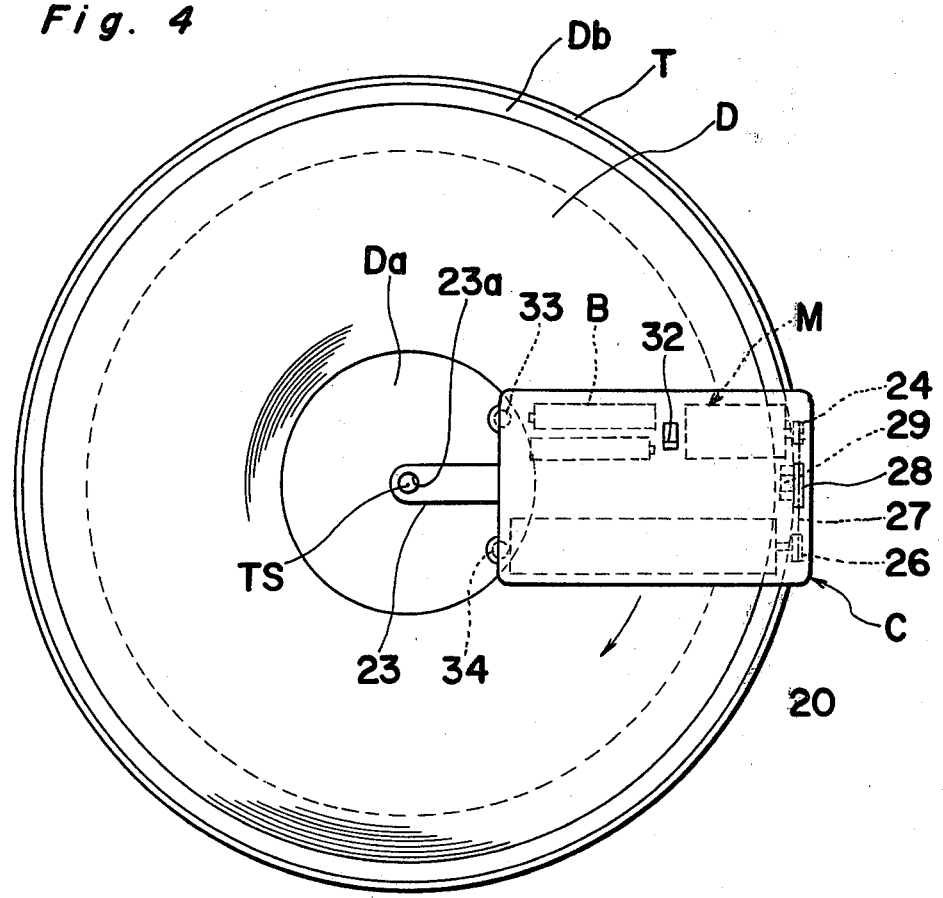
FIG. 4 is a top plan view showing the record cleaner when in use, that is, mounted on a disc record resting on a turntable.

As best shown in FIGS. 1 and 4, the casing C has an connecting arm 23 having one end rigid with the casing C in level with the bottom wall 14 and the other end formed with a bearing hole 23a of a diameter sufficient to receive a turntable spindle TS therethrough, said arm 23 extending outwardly from the casing C in a direction parallel to the longitudinal axis of the cylindrical cleaning element 20.

The record cleaner embodying the present invention also comprises a battery operated motor drive unit including a micromotor M having a drive shaft on which a drive pulley 24 is rigidly mounted for rotation together therewith. This motor M is housed within the casing C and rigidly mounted on the bottom wall 14 with its drive shaft extending in parallel relation to the core member 21 of the cylindrical cleaning element 20 in a direction toward the end wall 10 remote from the arm 23. A battery chamber for accommodating two batteries B in side-by-side fashion is defined within the casing C in line with the motor M, it being to be noted that the cylindrical cleaning element 20 and a pair of the motor M and the batteries are arranged on respective sides with respect to the imaginary line drawn in alignment with the longitudinal axis of the arm 23.

A drive wheel 25 made of a hard synthetic resin and having its peripheral face lined with a rubber lining 25a is rotatably supported in any suitable manner on the bottom wall 14 with a portion of the periphery thereof exposed to the outside of the casing C through the slot 14b, said drive wheel 25 being positioned substantially intermediately between the drive pulley 24 and a driven pulley 26 which is rigidly mounted on one end of the core member 21 remote from the arm 23 for rotation together therewith. The driven pulley 26 is adapted to receive a drive from the motor M through an endless belt 27 which is suspended between the drive and driven pulleys 24 and 26. For transmitting the drive from the motor M to the drive wheel 25, a dual purpose roller assembly is utilized, which dual purpose roller assembly includes a tensioning pulley 28 and a slip roller 29 secured rigidly to, or otherwise formed integrally with, the tensioning pulley 28 in coaxial relation thereto for rotation together therewith. This dual purpose roller assembly is rotatably mounted on a crank shaft 30 having one end portion 30a carrying the dual purpose roller assembly (that is, the tensioning pulley 28 and the slip roller 29) and the other end portion 30b rotatably journalled to any suitable support member which may be a support plate that extends between the top and bottom walls 13 and 14 within the casing C in spaced relation to the end wall 10 remote from the arm 23. This crank shaft 30 is so shaped that the dual purpose roller assembly can rotate not only about the first end portion 30a of the crank shaft 30, but also about the second end portion 30b thereof, and is so positioned that the tensioning pulley 28 and the slip roller 29 are respectively drivingly engaged to a substantially intermediate portion of the upper run of the endless belt 27 and the drive wheel 25 as best shown in FIG. 2. It is to be noted that care is required to determine the position of the axis of rotation of the dual purpose roller assembly about the second end portion 30b of the crank shaft 30 relative to the axis of rotation of the drive wheel 25, or otherwise means for restricting the angular movement of the dual purpose roller assembly about the second end portion 30b of the crank shaft 30 will be needed. In other words, so far illustrated, the axis of rotation of the dual purpose roller assembly about the second end portion 30b of the crank shaft 30 is so selected as to be in axially offset relation to the axis of rotation of the drive wheel 25 and as to be located substantially intermediately between the axis of rotation of the drive wheel 25 and the axis of rotation of the dual purpose roller assembly about the first end portion 30a of the crank shaft 30.

In the construction so far described, it will readily be seen that the drive of the endless belt 27 effected during rotation of the motor M is transmitted to the drive wheel 25 through the tensioning pulley 28 and then through the slip roller 29, thereby driving the drive wheel 25 in a direction counter to the direction of rotation of the cylindrical cleaning element 20 as shown by the respective arrows in FIG. 3.

In FIG. 1, reference numeral 31 represents a lid for closing the opening defined in the casing C in communication with the battery chamber and reference numeral 32 represents a switch knob of any suitable construction for manipulating a power switch electrically connected in series with the motor M through the series-connected batteries B.

Referring back to FIG. 1, the casing C has a pair of spaced ball rollers 33 and 34 one on each side of the arm 23, each of said ball rollers 33 and 34 being non-detachably carried by the casing C at a position adjacent to the joint between the bottom wall and the end wall 10 adjacent the arm 23. These ball rollers 33 and 34 partially protrude to the outside of the casing C and are adapted to rollingly ride on a non-recorded or non-grooved area Da of a disc record D (FIG. 4) while keeping the bottom wall 14 of the casing C in equally spaced relation to the surface of the disc record D in cooperation with the drive wheel 25.

It is to be noted that the side edge of the partition wall member 16 adjacent the side wall 11 is comb-shaped for the purpose of removing fine dusts carried by the cylindrical brush 22 and then to positively transfer the removed fine dusts into the dust collecting chamber 15 during the rotation of the cylindrical cleaning element 20.

While the self-propelled record cleaner according to the present invention is constructed in the manner as hereinbefore described, it can be used in the following manner.

Assuming that the disc record D is placed on any known turntable T of the record player with the turntable spindle TS upwardly and outwardly protruding through the center opening in the disc record D, the record cleaner is placed on the disc record D with the bearing hole 23a in the arm 23 receiving the turntable spindle TS therethrough. When the record cleaner is so placed on the disc record D, the ball rollers 33 and 34 rest on the non-grooved area Da of the disc record D coaxially adjacent to the turntable spindle TS while the drive wheel 25 may ride on either an outer peripheral margin Db of the disc record D or an outer peripheral edge portion of the turntable T. Thereafter, the user has to turn the power switch on to energize the motor M.

By so doing, the record cleaner starts its movement on the disc record around the turntable spindle TS in a direction shown by the arrow in FIG. 4 while the cylindrical cleaning element 20 is driven in the direction counter to the direction of rotation of the drive wheel 25. Accordingly, dusts resting on the disc record D, particularly the grooved area of the record D positioned between the non-grooved area Da and the peripheral margin Db, are brushed by the cylindrical brush 21 and transported into the dust collecting chamber 15 by the action of the air current induced by the rotation of the brush 21. Some of the dust may adhere to the brush 21 and in which case, they are removed from the brush 21 by the action of the comb-shaped side edge of the partition wall member 16 onto the dust collecting chamber 15. The dusts within the dust collecting chamber 15 will not escape to the outside of the record cleaner because they are trapped by the filter member 18 attached to the perforated lid 17.

After the record cleaner has completed one or two turns on the disc record D around the turntable spindle TS, what the user should do is to turn the power switch off before or after the record cleaner is removed out of the disc record D.

Although the present invention has fully been described in connection with the preferred embodiment thereof, it is to be noted that various changes and modifications are apparent to those skilled in the art. By way of example, in order for the record cleaner according to the present invention to be utilizable with not only disc records of one particular size, but also disc records of another size, the connecting arm 23 may be adjustably slidably connected to the casing C so that the length of projection of the arm 23 relative to the casing C can be adjustable.

In addition, although the drive wheel 25 and the ball rollers 33 and 34 have been described and shown as adapted to ride on the outer peripheral margin Db of the disc record D and the non-grooved area Da of the same disc record D, respectively, they are reversed in position relative to each other. This can readily be accomplished by connecting the arm 23 to the end wall 10 adjacent to the drive wheel 25 so that, when the record cleaner is in use, the drive wheel 25 can rest on the non-grooved area Da of the disc record. This arrangement is advantageous in that the possibility of slip of the drive wheel 25 relative to the disc record D can be minimized.

Moreover, the ball rollers 33 and 34 may be replaced with wheels.

Accordingly, such changes and modifications are to be understood as included within the true scope of the present invention unless they depart therefrom.

I claim:

1. A self-propelled record cleaner for cleaning a disc record having a center opening, a non-grooved area coaxial with the center opening, a grooved area coaxial with the center opening and positioned on one side of the non-grooved area opposite to the center opening and an outer peripheral margin, all being defined on at least one surface of the disc record, said disc record being mounted on a support having a spindle which, when the disc record is so mounted with said at least one surface thereof facing in a direction opposite to the support, projects through the center opening, said self-propelled record cleaner comprising, in combination:
    a generally elongated casing having a dust collecting chamber defined therein;
    a generally cylindrical cleaning element supported in the casing so as to extend in a radial direction of the disc record when the record cleaner is mounted on the support with the disc record held between the support and the record cleaner;
    means carried by the casing for engagement with the spindle to enable the casing to rotate around the spindle;
    means for defining a passage for guiding dusts being removed from the disc record by the cleaning element into the dust collecting chamber;
    a drive wheel adapted to run on the disc record and rotatably carried by the casing; and
    means for driving said drive wheel and said cylindrical cleaning element in opposite directions with each other.

2. A self-propelled record cleaner as claimed in claim 1, further comprising at least two roller elements operatively carried by the casing to provide a three-point support for the record cleaner in cooperation with the drive wheel.

3. A self-propelled record cleaner as claimed in claim 1 or 2, wherein said driving means comprises a battery-operated motor having a drive shaft, a drive pulley rigidly mounted on the drive shaft, a driven pulley rigidly mounted on one end of the cylindrical cleaning element, an endless belt member suspended between the drive and driven pulleys, and means for transmitting the movement of the endless belt to the drive wheel and also for adjusting the tension of the endless belt member.

4. A self-propelled record cleaner as claimed in claim 3, wherein said transmitting and adjusting means comprises a tensioning pulley and a slip roller coaxially connected to said tensioning pulley for rotation together therewith, and a crank shaft member having one end on which the tensioning pulley and the slip roller are rotatably mounted and the other end so rotatably connected to a portion of the casing within the casing as to permit both of the tensioning pulley and the slip roller to move angularly about the axis of said other end of the crank shaft, said tensioning pulley being constantly engaged to a portion of the endless belt member while said slip roller is frictionally engaged to the peripheral face of the drive wheel, whereby the movement of the endless belt member results in rotation of the tensioning pulley and the slip roller together about the one end of the crank shaft, the rotation of said slip roller being transmitted to the drive wheel.

* * * * *